United States Patent
Dudill et al.

(10) Patent No.: US 7,500,849 B2
(45) Date of Patent: Mar. 10, 2009

(54) EMULSION ATOMIZER NOZZLE, AND BURNER, AND METHOD FOR OXY-FUEL BURNER APPLICATIONS

(75) Inventors: Roger Dudill, West Midlands (GB); David Millington, Staffordshire (GB)

(73) Assignee: Air Products and Chemicals, Inc., Allentown, PA (US)

( * ) Notice: Subject to any disclaimer, the term of this patent is extended or adjusted under 35 U.S.C. 154(b) by 584 days.

(21) Appl. No.: 11/037,664

(22) Filed: Jan. 18, 2005

(65) Prior Publication Data

US 2005/0263225 A1      Dec. 1, 2005

Related U.S. Application Data

(60) Provisional application No. 60/536,964, filed on Jan. 16, 2004.

(51) Int. Cl.
F23C 5/00        (2006.01)
F23C 5/00432     (2006.01)

(52) U.S. Cl. .............................. 431/8; 431/187; 239/418

(58) Field of Classification Search ................ 431/8, 431/3, 4, 187; 239/8, 398, 434.5, 601, 418
See application file for complete search history.

(56) References Cited

U.S. PATENT DOCUMENTS

| | | | |
|---|---|---|---|
| 4,473,185 A * | 9/1984 | Peterson et al. | 239/8 |
| 5,149,261 A * | 9/1992 | Suwa et al. | 431/207 |
| 5,393,220 A | 2/1995 | Couwels et al. | |
| 5,547,368 A | 8/1996 | Slavejkov et al. | |
| 5,567,141 A * | 10/1996 | Joshi et al. | 431/8 |
| 5,617,997 A | 4/1997 | Kobayashi et al. | |
| 5,782,626 A * | 7/1998 | Joos et al. | 431/8 |
| 6,068,468 A | 5/2000 | Philippe et al. | |
| 6,074,197 A | 6/2000 | Philippe | |

(Continued)

FOREIGN PATENT DOCUMENTS

JP        11-141811        5/1999

(Continued)

OTHER PUBLICATIONS

Lefebvre, A., "Atomisation and Sprays", Atomization and Sprays, 1998, pp. 136-140, New York, NY USA.

(Continued)

*Primary Examiner*—Kenneth B Rinehart
*Assistant Examiner*—Chuka C Ndubizu
(74) *Attorney, Agent, or Firm*—Anne B. Kiernan

(57) ABSTRACT

A method for oxy-fuel combustion, the method comprising the steps of: introducing a liquid fuel into an emulsion chamber through a liquid fuel conduit having an effective diameter, the emulsion chamber having a length that is 2 times or less than 2 times of said effective diameter of said liquid fuel conduit; introducing an atomizing gas into the emulsion chamber through at least one atomizing gas conduit; mixing the liquid fuel and the atomizing gas in said emulsion chamber to create an emulsion mixture that has a mean residence time in said emulsion chamber of from 500 to 800 μs, the emulsion mixture having an emulsion mixture velocity less than or equal to 12 m/s; and discharging said emulsion mixture through a generally rectangular-shaped orifice into an oxygen-enriched oxidizer stream. A nozzle and burner for oxy-fuel combustion are also disclosed.

20 Claims, 4 Drawing Sheets

U.S. PATENT DOCUMENTS

| | | |
|---|---|---|
| 6,174,160 B1 * | 1/2001 | Lee et al. ................ 431/11 |
| 6,793,693 B1 | 9/2004 | Koehne et al. |
| 2002/0048735 A1 | 4/2002 | Delaroy et al. |

FOREIGN PATENT DOCUMENTS

| | | |
|---|---|---|
| JP | 2004-225919 | 8/2004 |

OTHER PUBLICATIONS

Bulletin 4680 Leaflet, Oxy-Therm LE FF (Flat Flame) Burners, Maxon Corporation, 201 E. 18th Street, Muncie, Indiana, Patent #5,431,559 and 5,458,483, p. 4682, Aug. 2003.

* cited by examiner

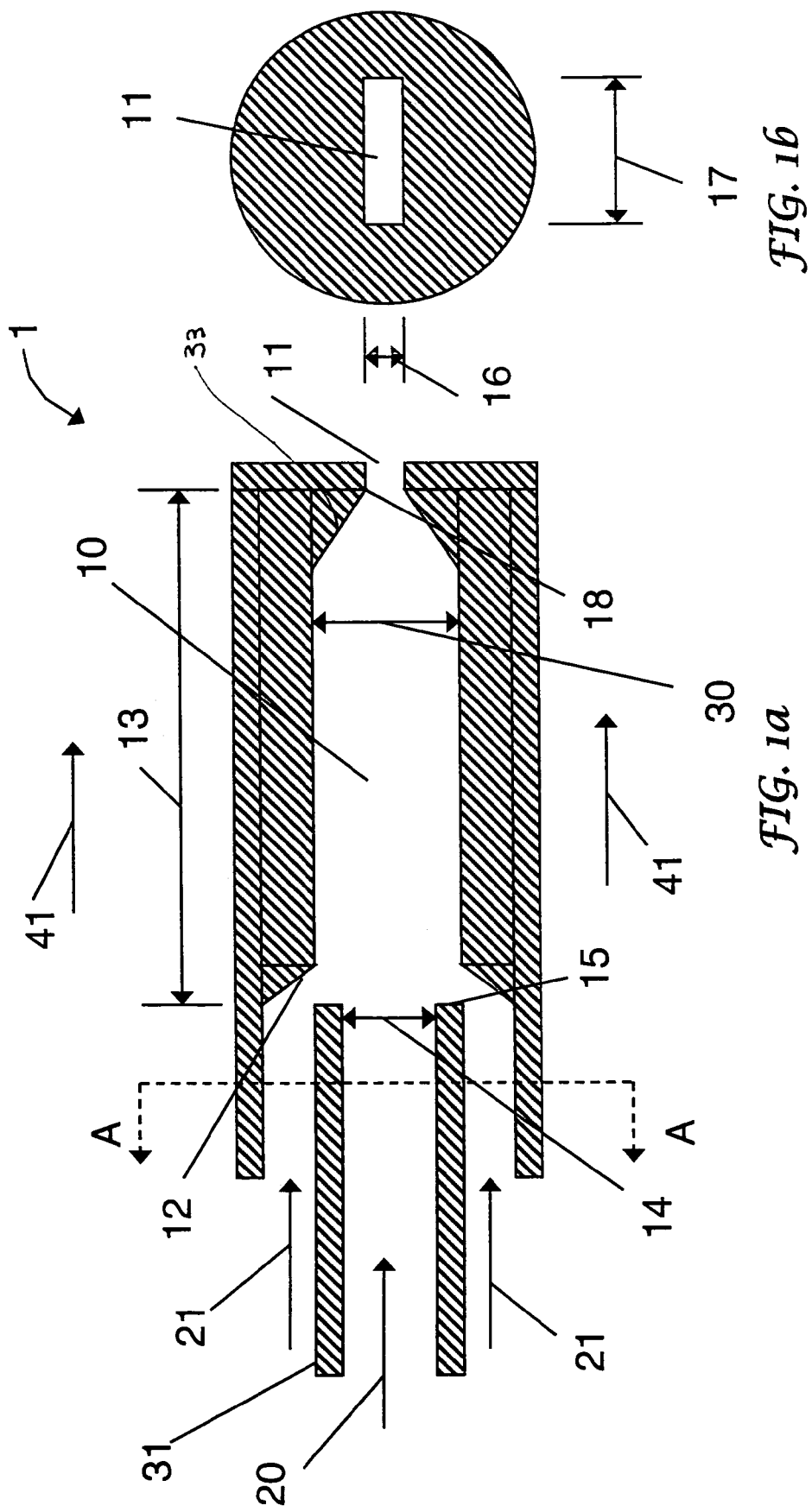

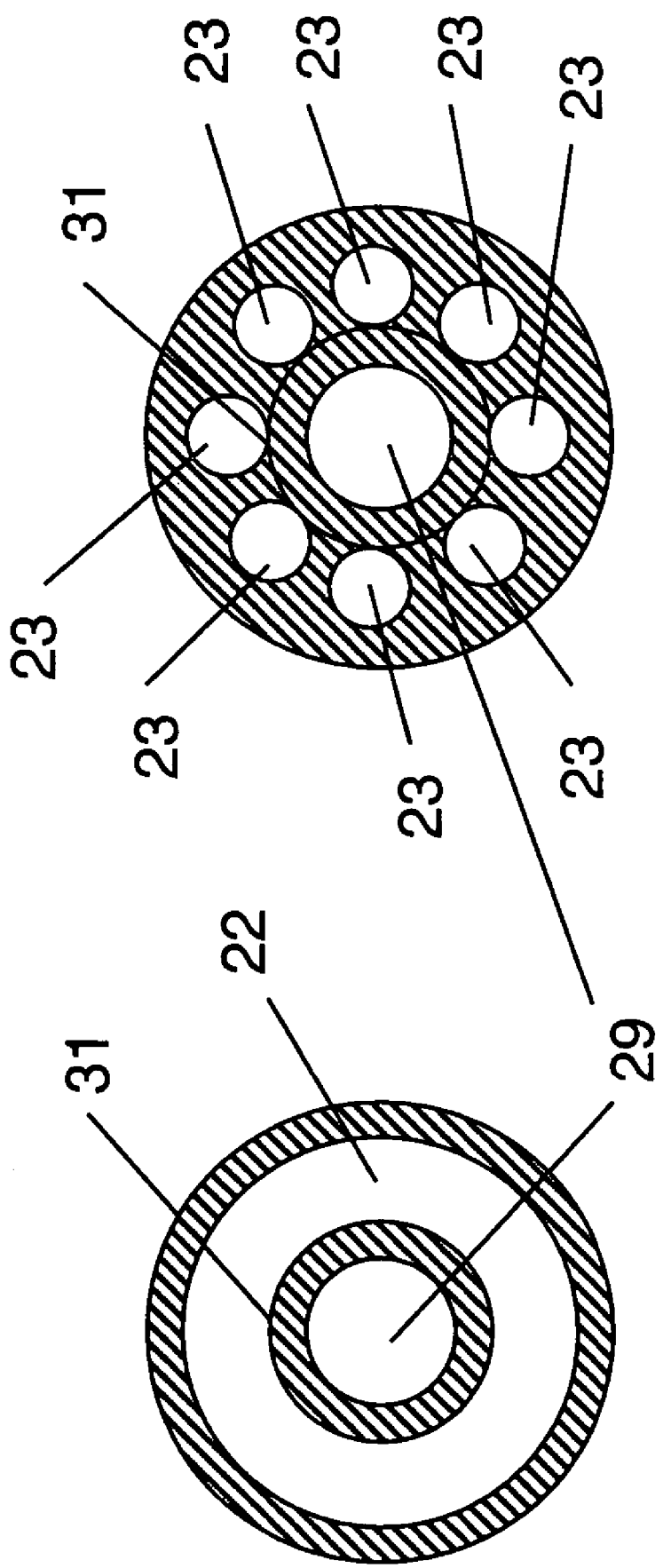

EMULSION ATOMIZER NOZZLE, AND BURNER, AND METHOD FOR OXY-FUEL BURNER APPLICATIONS

This patent application claims the benefit of a provisional patent application U.S. Ser. No. 60/536,964, filed Jan. 16, 2004 that is incorporated herein by reference.

FIELD OF THE INVENTION

The present invention pertains to liquid fuel nozzles for oxygen based combustion and methods of using them for producing elevated temperatures in industrial melting furnaces.

BACKGROUND OF THE INVENTION

Use of atomizer nozzles is known in the art as illustrated in U.S. Pat. Nos. 5,547,368, 5,567,141, 5,393,220 and 5,617,997, incorporated herein by reference in their entirities. As described in U.S. Pat. No. 5,547,368, atomizer nozzles are used in industrial melting furnaces for such diverse products as metals, glass, ceramic materials, and the like.

There are many ways of atomizing liquid fuels in combustion applications. The nozzles can be grouped in two major groups:

a) Pressure atomizers, where relatively high liquid fuel pressure is used to drive the flow through a small orifice, which breaks up the liquid into droplets. These atomizers are relatively simple. However, their turn down ratio is narrow requiring nozzle changes for systems that have wide variations in flow requirements.

b) Twin-fluid atomizers, where an atomizing gas is used to assist with liquid atomization. The atomizing gas usually is introduced at higher pressures, while the liquid fuel may be delivered at lower pressures. This group of nozzles can further be segmented into:

1) External-mixing, where the high-velocity atomizing gas meets with lower-velocity liquid fuel externally resulting in liquid-jet breakup, i.e. atomization. These nozzles are usually very rugged, however, the flame shape and atomization quality is most-often sub-optimal, especially in oxy-fuel burner applications. The flames are short, tight, leading to non-uniform heat delivery and local overheating.

2) Internal-mixing or emulsion, where the atomizing gas and liquid fuel are mixed inside an internal chamber, and the two-phase mixture is then ejected through an exit orifice causing liquid breakup due to depressurization of inter-mixed gaseous phase. These nozzles produce excellent and controllable atomization, excellent flame geometry and uniform heat transfer.

While the internal-mixing atomizers are widely used in air-fuel combustion, their use in oxy-fuel burners have been limited due to cooling concerns and possible flame flash-back issues. With non-water-cooled burners, the primary oxidizer cools the atomizing nozzle. For air-fuel burners in which the primary oxidizer is air cooling is accomplished due to the large volume of air (the primary oxidizer) that is needed and provided for complete combustion. However, for oxy-fuel burners, which are burners utilizing a primary oxidizer with a higher $O_2$ concentration than air, cooling of the atomizing nozzle via the reduced volume of the primary oxidizer may be unsatisfactory. For example, in case of a 100% $O_2$ oxidizer, if the stoichiometric required amount of oxygen for combustion is provided, there will be about 80% less volume of the primary oxidizer available to cool the atomizing nozzle than in air-fuel burners. In addition, oxy-fuel burners have much higher flame temperatures. For these reasons the atomizing nozzles in oxy-fuel burners are expected to run at much higher temperatures than in air-fuel burners.

Higher internal-mixing nozzle temperatures lead to several potential problems:

1) Elevated nozzle temperatures may cause chemical degradation of liquid fuels prior to their introduction into the furnace. More specifically, for fuel oils, such as heavy oils with high sulfur content, and oils with high carbon residue values (CCR) (e.g. oils with high levels of asphaltenes), high nozzle temperatures may lead to internal coke deposition and nozzle plugging. This is a concern regardless of the atomizing gas used.

2) Additionally, if oxygen is used as the atomizing gas, elevated nozzle temperatures and improper nozzle design may lead to flame flash-back and a catastrophic nozzle failure or meltdown.

The present invention teaches how to avoid the above operating problems by proper nozzle design.

SUMMARY OF THE INVENTION

This invention provides a method for oxy-fuel combustion, the method comprising: introducing a liquid fuel into an emulsion chamber through a liquid-fuel conduit having an effective diameter, said emulsion chamber having a length that is 2 times or less than 2 times of said effective diameter of said liquid fuel conduit; introducing an atomizing gas into said emulsion chamber through at least one atomizing gas conduit; mixing said liquid fuel and said atomizing gas in said emulsion chamber to create an emulsion mixture that has a mean residence time in said emulsion chamber of from 500 to 800 µs, said emulsion mixture having an emulsion mixture velocity less than or equal to 12 m/s; and discharging said emulsion mixture through a generally rectangular-shaped orifice into an oxygen-enriched oxidizer stream.

In another embodiment of this invention is provided a nozzle for oxy-fuel combustion comprising: a liquid fuel conduit having an effective diameter; an emulsion chamber having a length that is 2 times or less than 2 times of said effective diameter, said liquid fuel conduit disposed to introduce a liquid fuel into said emulsion chamber; at least one atomizing gas conduit for introducing atomizing gas into said emulsion chamber; wherein said liquid fuel and said atomizing gas mix in said emulsion chamber to create an emulsion mixture having an emulsion mixture velocity less than 12 m/s, and said emulsion mixture has a mean residence time in said emulsion chamber for 500 to 800 µs; means for providing an oxygen-enriched oxidizer stream; further wherein said emulsion chamber comprises a generally rectangular-shaped discharge orifice said emulsion mixture exits said emulsion chamber into said oxygen-enriched oxidizer stream.

In another embodiment of the invention is provided a burner for oxy-fuel combustion comprising: a liquid fuel conduit having an effective diameter; an emulsion chamber having a length that is 2 times or less than 2 times of said effective diameter, said liquid fuel conduit disposed to introduce a liquid fuel into said emulsion chamber; at least one atomizing gas conduit for introducing atomizing gas into said emulsion chamber; wherein said liquid fuel and said atomizing gas mix in said emulsion chamber to create an emulsion mixture having an emulsion mixture velocity less than 12 m/s, and said emulsion mixture has a mean residence time in said emulsion chamber for 500 to 800 µs; means for providing an oxygen-enriched oxidizer stream; and further wherein said emulsion chamber comprises a generally rectangular-shaped discharge orifice through which said emulsion mixture exits said emulsion chamber into said oxygen-enriched oxidizer stream.

BRIEF DESCRIPTION OF SEVERAL VIEWS OF THE DRAWINGS

FIG. 1a is a longitudinal cross section of a first and second embodiment of a nozzle of the current invention.

FIG. 1b is a cross sectional view of the front end face of the nozzle shown in FIG. 1a.

FIG. 2 is a cross section through A-A of FIG. 1a showing a first embodiment of the current invention.

FIG. 3 is a cross section through A-A of FIG. 1a showing a second embodiment of the current invention.

FIG. 5a is a longitudinal cross section of third embodiment of a nozzle of the current invention.

FIG. 5b is a cross sectional view of the front end face of the nozzle shown in FIG. 5a.

DETAILED DESCRIPTION OF THE INVENTION

"Oxy-fuel burners" are burners utilizing a primary oxidizer that has a higher $O_2$ concentration than air.

"Oxygen-enriched oxidizer" is defined as a fluid with greater than 30% $O_2$ by volume, for example, oxygen enriched air. Other oxygen-enriched oxidizer may have greater than 50%, or greater than 85% oxygen by volume.

The "atomizing gas" can be air, oxygen, oxygen-enriched oxidizer, natural gas, propane, nitrogen, carbon dioxide, hydrogen, or a mixture of two or more of these gases. In one embodiment, the atomizing gas is oxygen-enriched oxidizer.

"Liquid fuels" for the nozzle include fuel oils such as No. 1 distillate oil, No. 2 distillate fuel oil, diesel fuel, kerosene, No. 4 fuel oil, No. 5 residual oil, No. 6 residual fuel oil, and Bunker-C type fuel oil, and others known to a person of ordinary skill in the art.

Figures 5A, 5B:
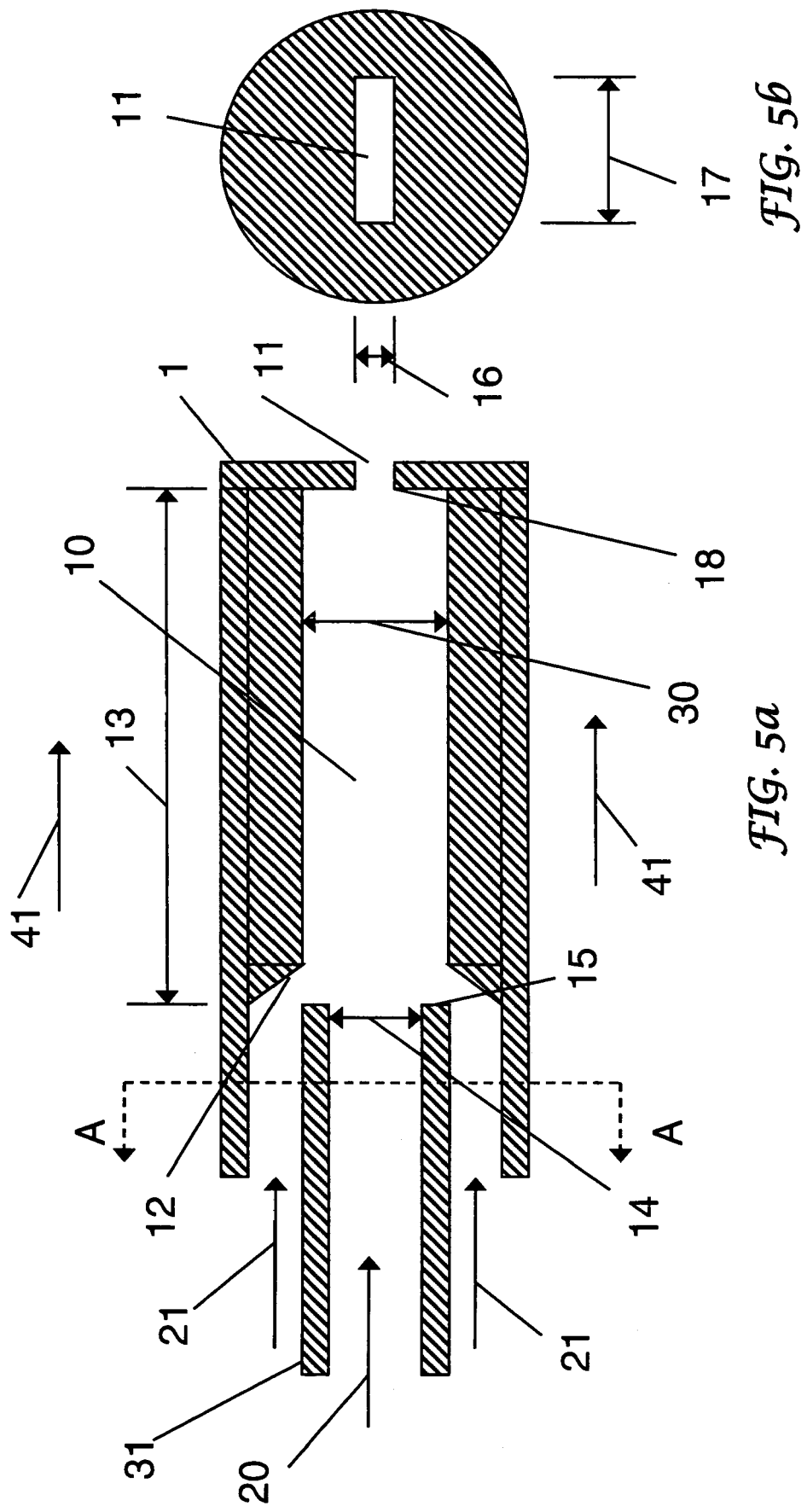

The present invention is a nozzle of the internal-mixing type. As shown in FIG. 1a and FIG. 5a, liquid fuel 20 is introduced into the emulsion chamber 10 through a conduit 31 having an outlet diameter 14, measured on the inside of the conduit 31 near or at the outlet end 15 of the conduit 31 that is adjacent to the emulsion chamber 10. Atomizing gas 21 is introduced into the emulsion chamber 10 through a passage or passages around the liquid fuel conduit 31. Atomizing gas can be introduced through a single annular passage 22 as shown in FIG. 2 or through multiple passages 23 as shown in FIG. 3. Atomizing gas 21 impinges on deflector surface 12 and subsequently mixes with the liquid fuel in the emulsion chamber 10. The deflector surface 12 is angled or shaped to direct the atomizing gas toward the emulsion chamber 10. Emulsion chamber 10 has diameter 30 and length 13. The diameter of the emulsion chamber 10 is measured on the inside of the emulsion chamber, and the length is measured from the outlet end 15 of the liquid fuel conduit 31 to the chamber-side 18 of the emulsion chamber orifice 11. Although the emulsion chamber and liquid fuel conduit are shown as cylindrical, the current invention is not limited to cylindrical shapes and/or circular cross sections for the conduit 31 or emulsion chamber 10. In case of non-circular conduits, an effective diameter can be calculated, said effective diameter giving the same cross sectional area. In FIG. 1a, the emulsion chamber also shows a tapered portion 33 located towards the orifice 11, which is shown as conical-shaped, but may be spherical-shaped, or elliptical-shaped, or the like, and may extend over more or less of the length of the emulsion chamber than as shown. Alternatively, the shape of the emulsion chamber near the orifice may be rectangular as shown in FIG. 5a. Although the emulsion chamber is shown with a constant cross-section over a majority of (FIG. 1a) or all of (FIG. 5a) the emulsion chamber, the current invention is not limited to a constant cross-section. In alternative embodiments the emulsion chamber may be shaped to reduce in cross-section over a majority or all of its length from the fuel inlet to the orifice, thereby providing a tapered emulsion chamber.

The atomizing gas and liquid fuel mix inside the emulsion chamber to form an emulsion mixture (not shown) before being discharged from the emulsion chamber through a generally rectangular-shaped orifice 11 having a greater width 17 than height 16 to create a flame of greater width than height. (For the emulsion chamber orifice height, and width and other measurements, effective measurements may be used when necessary.) The primary oxidizer 41 which is an oxygen-enriched oxidizer flows in the direction indicated towards the emulsion chamber orifice 11 where the emulsion mixture exits the nozzle. The primary oxidizer may be introduced around all or part of the nozzle 1.

Preferred embodiments of the nozzle geometry may include the following general design parameter guidelines:

| Design Parameter | Minimum Value | Maximum Value |
|---|---|---|
| Liquid fuel outlet effective diameter | 1.27 mm (0.05 in.) | 12.7 mm (0.5 in) |
| Emulsion chamber orifice width | 3 mm (0.118 in.) | 25.4 mm (1 in) |
| Emulsion chamber orifice height | 0.75 mm (0.03 in.) | 4.5 mm (0.177 in) |
| Area (liquid fuel outlet)/ Area (emulsion chamber orifice) | 0.1 | 2 |
| Emulsion chamber cross section area | | Sufficiently small to create generally plug flow (no dead zones) of the emulsion mixture inside the chamber |
| Emulsion chamber cross section area | | Constant or decreasing from emulsion mixture inlet to outlet |
| Emulsion chamber length | 0.5 times liquid fuel outlet effective diameter | 2 times liquid fuel outlet effective diameter |
| Mean Residence Time | 500 μs | 800 μs |

According to the invention, the emulsion chamber length 13 may be from 0.5 times to 2 times the liquid fuel outlet effective diameter 14 for sufficient mixing of the atomizing gas and liquid fuel prior to being discharged through the flame-shaping orifice 11. Alternatively, the emulsion chamber length 13 may be from 1 time to 2 times, or about 1.7 times the liquid fuel outlet effective diameter of conduit 31. The liquid fuel and the atomizing gas should remain in the emulsion chamber for a mean residence time from 500 to 800 μs, from 550 to 780 μs, or from 600 to 750 μs. When the liquid fuel and atomizing gas are provided an opportunity to mix in the emulsion chamber in accordance with this invention, the coke build up is decreased as is the maintenance to clean the nozzle.

The mean residence time is calculated by dividing the overall emulsion chamber volume (over the emulsion chamber length defined earlier) by the emulsion mixture volumetric flow rate. The emulsion mixture volumetric flow rate is calculated by adding the volumetric flow rates of both the oil and atomizing gas. Since the atomizing gas is compressible, the actual volumetric flow rate for the gas is obtained by correcting for pressure. For example, if the oil flow rate is 70 liters/hour, the atomizing gas flow rate is 11 normal meters cubed per hour ($Nm^3/h$), the pressure in the emulsion chamber is 2.4 bar, the emulsion mixture volume rate is:

$$\left(\frac{70 \text{ l/h}}{1000 \text{ l/m}^3} + \frac{(11 \text{ Nm}^3/\text{h})(1.01325 \text{ bar})}{2.4 \text{ bar}}\right) \times \frac{h}{3600 \text{ s}} = 0.0013 \text{ m}^3/\text{s}$$

For a nozzle having an emulsion chamber volume of 790 $mm^3$, the mean residence time is:

790 $mm^3 \times 1/(0.0013\ m^3/s) \times m^3/1 \times 10^9\ mm^3$ = 608 µs

In some embodiments, the effective diameter of the liquid fuel outlet may be from 1.27 mm to 12.7 mm, or from 1.27 mm to 10 mm, or from 1.27 to 8.5 mm, or 6.25 mm. In some embodiments, the emulsion chamber orifice width may be from 3 mm to 25.4 mm, or from 4 mm to 20 mm, or about 14.2 mm. In some embodiments, the emulsion chamber orifice height may be from 0.75 mm to 7.62 mm, or 0.75 to 4.5 mm, or about 1.4 mm. In some embodiments, the area of the liquid fuel outlet/area of the emulsion chamber orifice may be from 0.1 to 2, or from 0.1 to 1:6, or about 1.1. These areas are cross-sectional areas. The area for the liquid fuel outlet is equivalent to the non-hatched circular area 29 shown in FIG. 2. (Note, if the cross-sectional area of the conduit 31 were not constant, the cross-sectional area would need to be measured at the outlet and not where line A-A intersects FIG. 1*a*.) In the embodiment shown in FIG. 1*b*, the area of the emulsion chamber orifice is equal to the non-hatched area shown in FIG. 1*b*.

In some embodiments, the liquid fuel is introduced into the emulsion chamber at from 10 to 250 liters/hour, or from 15 to 200 liters/hour, or from 50 to 150 liters/hour. In some embodiments, the atomizing gas is introduced into the emulsion chamber at from 1 to 20 $Nm^3/hr$ or from 5 to 15 $Nm^3/hr$. To create generally plug flow in the emulsion chamber, the emulsion mixture velocity may be at or less than 12 m/s, to prevent coke deposition and nozzle plugging. Plug flow means that the emulsion mixture moves through the emulsion chamber, such that there are no stagnant or recirculating zones created. The flow in the emulsion chamber may be turbulent flow. The emulsion mixture velocity may be from 5 to 12 m/s, from 6 to 12 m/s, or from 8 to 12 m/s.

The emulsion mixture velocity is calculated by adding the volumetric flow rates of both the oil and atomizing gas and dividing the result by the cross sectional area of the emulsion chamber. As described earlier, since the atomizing gas is compressible, the actual volumetric flow rate for the gas is obtained by correcting for pressure. For example, if the oil flow rate is 70 liters/hour, the atomizing gas flow rate is 11 $Nm^3/h$, the pressure in the emulsion chamber is 2.4 bar, and the cross sectional area of the emulsion chamber is 116 $mm^2$, the emulsion mixture velocity is:

$$\left(\frac{70 \text{ l/h}}{1000 \text{ l/m}^3} + \frac{(11 \text{ Nm}^3/\text{h})(1.01325 \text{ bar})}{2.4 \text{ bar}}\right) \times$$

$$\frac{h}{3600 \text{ s}} \times \frac{1E6 \text{ mm}^2}{m^2} \Big/ (116 \text{ mm}^2) = 11.3 \text{ m/s}$$

If the area of the emulsion chamber varies over its length, the largest area is used for the calculation of the emulsion mixture velocity.

The atomizer nozzle of the current invention is made in the conventional manner known by one of ordinary skill in the art.

Figure 4:
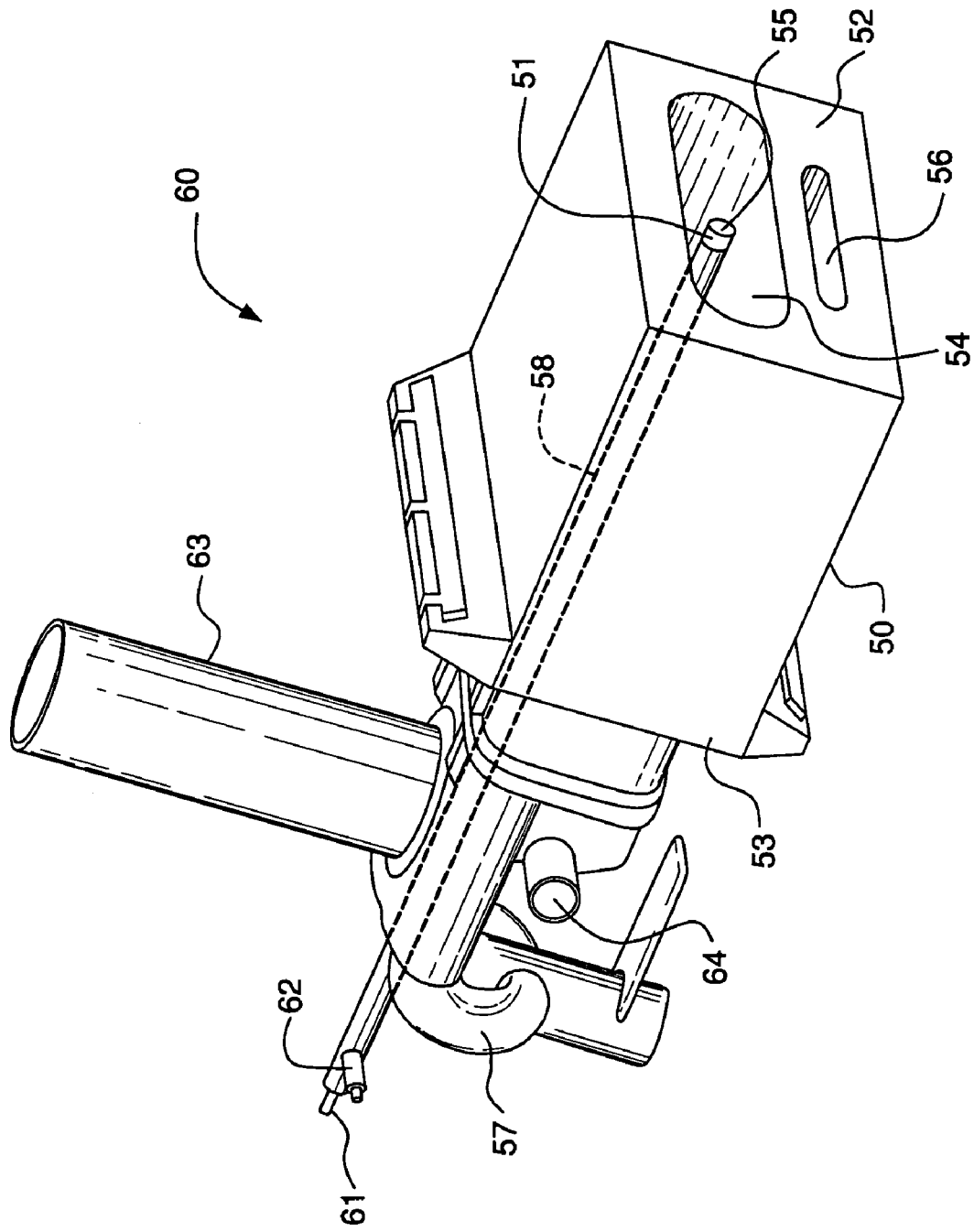
FIG. 4 shows an oxy-fuel burner that incorporates the nozzle of the current invention.

In one embodiment of this invention as shown in FIG. 4, an atomizer nozzle 51 of this invention is used in a burner 60. The atomizer nozzle 51 is located toward the hot face 52 of a burner block 50. The emulsion chamber orifice 55 of the nozzle is placed close enough to the hot face 52, that is, forward enough in the burner block 50 so as to prevent or limit the spraying of the emulsion mixture (liquid fuel) on the inside of burner block passage wall 54. Passage wall 54 defines a passage way for the primary oxidant (shown as 41 in FIG. 1*a*) to flow around the nozzle 51. The primary oxidant enters the burner 60 via pipes 57. The primary oxidant may be supplied from a liquid oxygen tank source or an on-site generator, such as, a pressure or vacuum swing adsorption unit or a cryogenic separation unit. The hot face 52 of the burner block 50 is adjacent to the flame, i.e. the hot side of the burner block 50, and the cold face 53 of the burner block 50 is the opposite side, which is adjacent to the outside of the furnace, i.e. the cold side of the block. In the embodiment shown in FIG. 4, the burner block 50 provides a conduit 56 for oxidant staging. Other aspects of the burner shown can be found in copending U.S. application Ser. No. 10/919,940, filed Aug. 16, 2004, incorporated herein by reference. However, this invention is not limited to the burner configuration shown. Other embodiments of burners that are useful in this invention can be found in U.S. Pat. Nos. 5,360,171; 5,545,031; 5,611,682; 5,575,637; 4,690,635; 5,439,373; 5,924858; 5,458,483 and 5,431,559, incorporated herein by reference. The nozzle described herein can be used with any burner that provides means to provide an oxygen-enriched oxidant as the primary oxidant.

COMPARATIVE EXAMPLE 1

Atomizer Nozzle with Emulsion Velocity Greater than 12 m/s

A conventional atomizer nozzle having an emulsion velocity varying from 13 to 14.7 m/s, and residence times greater than 800 µs, for No. 6 fuel oil having flow rates from 50 to 200 liters per hour was tested. The nozzle was positioned close to the hot face of the burner block as illustrated in FIG. 4. Carbon built up on the nozzle required cleaning from once a day to twice a week. The necessity to clean the nozzle was determined by flame characteristics, or liquid fuel and/or atomizing gas pressure increase. The flame would be distorted due to maldistribution of the fuel oil.

EXAMPLE 2

Atomizer Nozzle with Emulsion Velocity Less than 12 m/s

An atomizer nozzle according to the invention was tested having an emulsion velocity varying from 8 to 12 m/s, and residence time between 500 to 800 μs for No. 6 fuel oil having flow rates from 50 to 200 liters per hour. The nozzle was positioned close to the hot face as illustrated in FIG. 4. The necessity to clean the nozzle was reduced to less than once a month.

This invention has been described with reference to particular embodiments, however the invention should not be limited to those embodiments and includes modifications and equivalent arrangements that fall within the scope and spirit of the following claims.

The invention claimed is:

1. A method for oxy-fuel combustion for industrial melting furnaces, said method comprising the steps of:
    introducing a liquid fuel into an emulsion chamber through a liquid fuel conduit having an effective diameter, said emulsion chamber having a length that is 2 times or less than 2 times of said effective diameter of said liquid fuel conduit;
    introducing an atomizing gas into said emulsion chamber through at least one atomizing gas conduit;
    mixing said liquid fuel and said atomizing gas in said emulsion chamber to create an emulsion mixture that has a mean residence time in said emulsion chamber of from 500 to 800 μs, said emulsion mixture having an emulsion mixture velocity less than or equal to 12 m/s; and
    discharging said emulsion mixture through a generally rectangular-shaped orifice into an oxygen-enriched oxidizer stream.

2. The method of claim 1, wherein said oxygen-enriched oxidizer stream comprises greater than 50% by volume oxygen.

3. The method of claim 1, wherein said length of said emulsion chamber is from 0.5 to 2 times greater than said effective diameter of said liquid fuel conduit.

4. The method of claim 1, wherein said mean residence time is from 550 to 780 μs.

5. The method of claim 1, wherein said effective diameter is from 1.27 to 12.7 mm.

6. The method of claim 1, wherein said orifice further comprises a width from 3 mm to 25.4 mm and a height from 0.75 mm to 7.62 mm.

7. The method of claim 1, wherein said introducing a liquid fuel step is at a rate from 10 to 250 liters/hour, and said introducing an atomizing gas step is at a rate of 1 to 20 normal cubic meters per hour.

8. A industrial melting furnace nozzle for oxy-fuel combustion comprising:
    a liquid fuel conduit having an effective diameter;
    an emulsion chamber having a length that is 2 times or less than 2 times of said effective diameter, said liquid fuel conduit disposed to introduce a liquid fuel into said emulsion chamber;
    at least one atomizing gas conduit for introducing atomizing gas into said emulsion chamber;
    wherein said liquid fuel and said atomizing gas mix in said emulsion chamber to create an emulsion mixture having an emulsion mixture velocity less than 12 m/s, and said emulsion mixture has a mean residence time in said emulsion chamber for 500 to 800 μs;
    means for providing an oxygen-enriched oxidizer stream;
    further wherein said emulsion chamber comprises a generally rectangular-shaped discharge orifice said emulsion mixture exits said emulsion chamber into said oxygen-enriched oxidizer stream.

9. A industrial melting furnace burner for oxy-fuel combustion comprising:
    a liquid fuel conduit having an effective diameter;
    an emulsion chamber having a length that is 2 times or less than 2 times of said effective diameter, said liquid fuel conduit disposed to introduce a liquid fuel into said emulsion chamber;
    at least one atomizing gas conduit for introducing atomizing gas into said emulsion chamber;
    wherein said liquid fuel and said atomizing gas mix in said emulsion chamber to create an emulsion mixture having an emulsion mixture velocity less than 12 m/s, and said emulsion mixture has a mean residence time in said emulsion chamber for 500 to 800 μs;
    means for providing an oxygen-enriched oxidizer stream; and
    further wherein said emulsion chamber comprises a generally rectangular-shaped discharge orifice through which said emulsion mixture exits said emulsion chamber into said oxygen-enriched oxidizer stream.

10. The burner of claim 9, wherein said oxygen-enriched oxidizer stream comprises greater than 50% by volume oxygen.

11. The burner of claim 9, wherein said length of said emulsion chamber is from 0.5 to 2 times greater than said effective diameter of said liquid fuel conduit.

12. The burner of claim 9, wherein said mean residence time is from 550 to 780 μs.

13. The burner of claim 9, wherein said effective diameter is from 1.27 to 12.7 mm.

14. The burner of claim 9, wherein said orifice comprises a width from 3 mm to 25.4 mm and a height from 0.75 mm to 7.62 mm.

15. The burner of claim 9, wherein said liquid fuel conduit comprises an outlet area and said orifice comprises an area, and wherein said outlet area divided by said orifice area is from 0.1 to 2.

16. The burner of claim 9, wherein said liquid fuel conduit comprises an outlet area and said orifice comprises an area, and wherein said outlet area divided by said orifice area is from 0.1 to 1.6.

17. The burner of claim 9, wherein said orifice comprises a width from 4 mm to 20 mm and a height from 0.75 mm to 4.5 mm.

18. The burner of claim 9, wherein said emulsion chamber comprises a tapered portion.

19. The burner of claim 15, wherein said emulsion chamber comprises a tapered portion.

20. The burner of claim 9, wherein said emulsion chamber is tapered over its length.

* * * * *